United States Patent [19]
Teng et al.

[11] Patent Number: 5,613,130
[45] Date of Patent: Mar. 18, 1997

[54] CARD VOLTAGE SWITCHING AND PROTECTION

[75] Inventors: Yen-Chang G. Teng, San Jose; Robert K. Bendler, Mountain View, both of Calif.

[73] Assignee: Vadem Corporation, San Jose, Calif.

[21] Appl. No.: 337,302

[22] Filed: Nov. 10, 1994

[51] Int. Cl.$^6$ .................................................... G06F 1/26
[52] U.S. Cl. ............................................. 395/750; 395/283
[58] Field of Search .................................. 395/282, 283, 395/750, 284, 836, 834

[56] References Cited

U.S. PATENT DOCUMENTS

| | | | |
|---|---|---|---|
| 4,835,737 | 5/1989 | Herrig et al. | 395/750 X |
| 4,992,970 | 2/1991 | Igarashi | 395/750 X |
| 5,265,256 | 11/1993 | Chau-Lee et al. | 395/750 |
| 5,297,261 | 3/1994 | Kuranaga | 395/284 |
| 5,379,437 | 1/1995 | Celi, Jr. et al. | 395/750 |
| 5,410,717 | 4/1995 | Floro | 395/282 X |
| 5,428,798 | 6/1995 | Sekine et al. | 395/750 |

*Primary Examiner*—Glenn A. Auve
*Attorney, Agent, or Firm*—Fish & Neave

[57] ABSTRACT

A computer system having a power control unit for selection of voltage levels for pluggable cards, such as PCMCIA cards. The computer system includes a primary unit for executing two or more versions of control software (card drivers within the operating system) including a current version of control software. A pluggable PCMCIA card operates with a card voltage and has pins for signalling with a CD signal that the card is plugged into the computer system. The computer includes a power supply for providing at least first and second supply voltages such as 5 V, 3.3 V and x.x V. Power switches select one of the supply voltages as the card voltage. A power control unit controls the power switching unit to select one of the supply voltages. The power control unit includes a voltage select unit operable in response to the current version of the control software for storing a voltage code for specifying the selected one of the supply voltages. The power control unit includes a power enable unit operable to be set in response to the control software for enabling the voltage select unit and operable to be reset in the absence of the CD signal. The power control unit includes a code generating unit that in turn includes a synchronous unit operable in response to the control software for generating the voltage code and including a limit unit for limiting the voltage code to a maximum value and including asynchronous code generating unit operable in response to the CD signal for storing the voltage code in the voltage select unit.

12 Claims, 2 Drawing Sheets

CARD VOLTAGE SWITCHING AND PROTECTION

BACKGROUND OF THE INVENTION

The present invention relates to the field of computers and specifically to voltage selection for pluggable cards, such as PCMCIA cards, for computers.

Originally, PCMCIA cards operated from a 5 volt supply only. An emerging standard provides for cards that can operate at 3.3 volts only or can operate at either 3.3 volts or 5 volts. Also, a voltage less than 3.3 volts, which is designated x.x volts, has been proposed so that operation can occur at 5 volts, 3.3 volts or x.x volts. The maximum voltage that can be applied to a card is indicated by two connector pins on the card that are connected to the voltage sense (VS) inputs of the socket on the host computer when a card is inserted. It is important not to exceed the maximum voltage or the card may be damaged.

The existing method of controlling card voltage is for control software (software driver) to read the voltage indicated by the VS connector pins, determine the maximum voltage, set bits in a voltage select register to select the desired voltage and then set a power enable bit to connect that voltage to the card. There are three ways that the existing method may cause damage to a low voltage card.

First, it is easy to mistakenly install an incorrect (for example, older) version of control software (for example, a software driver which does not have a correctly-operating voltage select function to provide the proper voltage select function. In the typical case where the voltage selection defaults to a higher voltage (for example, 5 volts), such default can result in a damaging higher voltage being applied to a lower-voltage card. If the register bits used for voltage selection are ones that were previously used by older software for another purpose, the software can erroneously specify a wrong voltage which will damage the card.

Second, if a correctly-operating version of control software is used, but other conditions cause an error (for example, an error due to a system crash), the voltage select bits can be written incorrectly so as to result in damage to the card.

Third, if a higher-voltage card is removed from a socket and a lower-voltage card is installed in its place at a time when the software is unable to react to the card change (for example, when the computer system is in a suspend mode or has crashed), the lower-voltage card can be damaged.

In light of the above background, there is a need to provide improved power control in computer systems particularly for PCMCIA cards of different voltages.

SUMMARY

The present invention is a computer system having a power control unit for selection of voltage levels for pluggable cards, such as PCMCIA cards. The computer system includes a primary unit for executing two or more versions of control software (card drivers within the operating system) including a current version of control software. A pluggable PCMCIA card operates with a card voltage and has pins for signalling with a CD signal that the card is plugged into the computer system. The computer includes a power supply for providing at least first and second supply voltages such as 5 V, 3.3 V and x.x V. Power switches select one of the supply voltages as the card voltage. A power control unit controls the power switching unit to select one of the supply voltages. The power control unit includes a voltage select unit operable in response to the current version of the control software for storing a voltage code for specifying the selected one of the supply voltages. The power control unit includes a power enable unit operable to be set in response to the control software for enabling the voltage select unit and operable to be reset in the absence of the CD signal. The power control unit includes a code generating unit that in turn includes a synchronous unit operable in response to the control software for generating the voltage code and including a limit unit for limiting the voltage code to a maximum value and including asynchronous code generating unit operable in response to the CD signal for storing the voltage code in the voltage select unit.

As a first advantage, the present invention overcomes problems of mistakenly installed or otherwise incorrect (for example, older) versions of control software that does not provide the proper voltage select function and thereby avoids card damage.

As a second advantage, even if a correctly-operating version of control software is used, the present invention overcomes problems caused by other conditions (for example, an error due to a system crash), the voltage select bits are stored in a manner that avoids damage to the card.

As a third advantage, even if a higher-voltage card is removed from a socket and a lower-voltage card is installed in its place at a time when the software is unable to react to the card change (for example, when the computer system is in a suspend mode or has crashed), the present invention still avoids damage to the lower-voltage card.

The foregoing and other objects, features and advantages of the invention will be apparent from the following detailed description in conjunction with the drawings.

DRAWING DESCRIPTION

DETAILED DESCRIPTION

Figure 1:
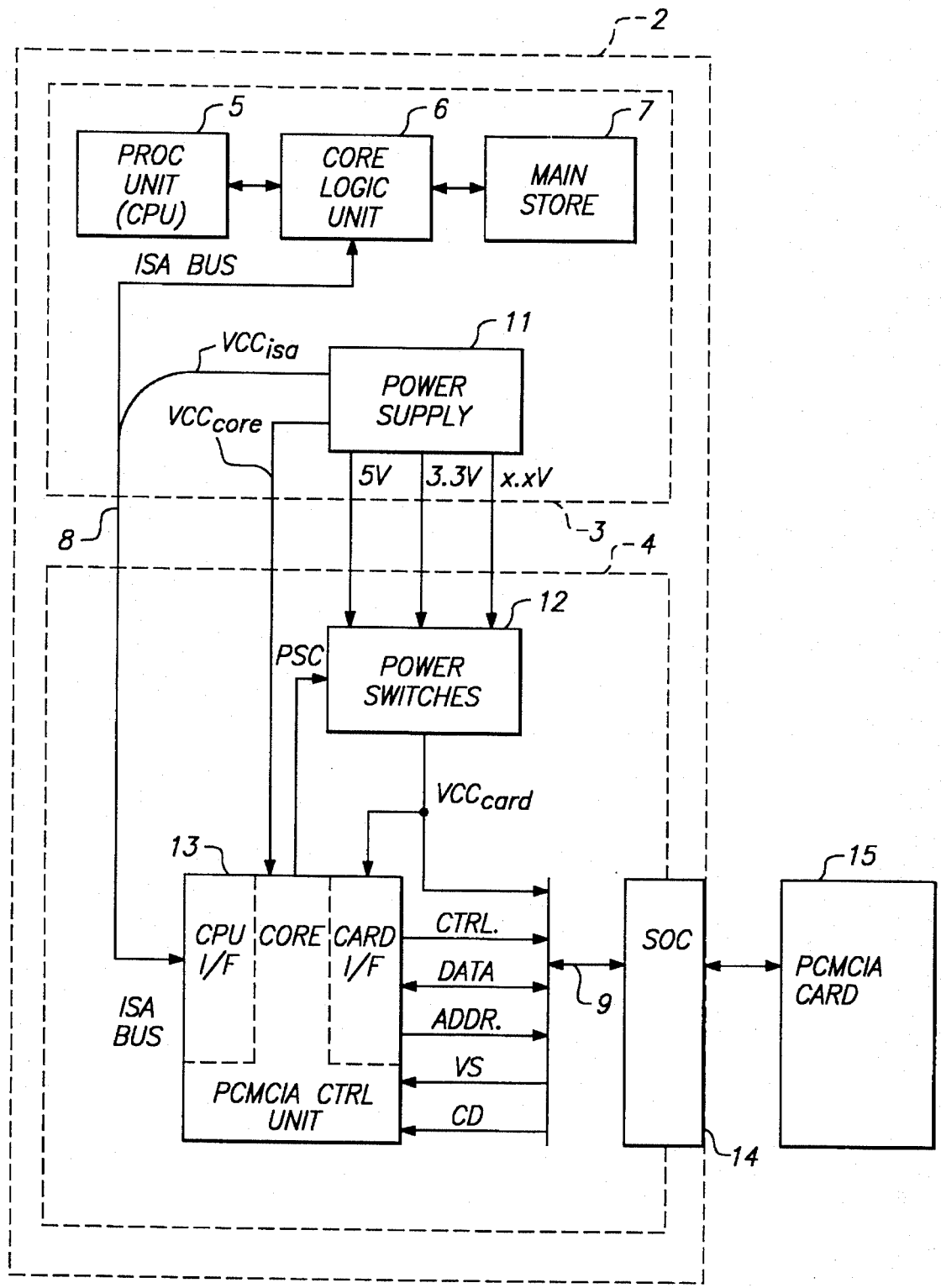
FIG. 1 depicts a block diagram of computer system with a PCMCIA power control unit according to the present invention.

In FIG. 1, the computer system 2 includes the primary unit 3 and the card power unit 4. The primary unit 3 includes conventional components of a computer system including a processing unit (CPU) 5, a core logic unit 6, a main store 7 and a power supply 11. Main store 7 stores control software (including PCMCIA drivers) which is executed by the processing unit 5 in a conventional manner. Other conventional components (not shown) that form a computer system are included within the primary unit 3. The core logic unit 6 controls core functions of computer system 2 including operation of the ISA bus 8. The power supply 11 generates and controls the power levels which are used in the computer system 2. Power supply 11 is a conventional device which, in the embodiment disclosed, generates VCC power voltage levels for use throughout the FIG. 1 system. Specifically, power supply 11 generates 5 V, 3.3 V and x.x V supplies. The x.x V supply is any voltage less than 3.3 V. The power supply 11 generates the VCCisa and VCCcore voltage levels which may be 5 V, 3.3 V or x.x V supplies or supplies with other voltages.

In the FIG. 1 system, the power switches 12 operate under control of PSC control signals to select one of the 5 V. 3.3 V or x.x V voltages from the power supply 11 as the VCCcard voltage. In the embodiment described switches 12 include three switches, one for each of the 5 V, 3.3 V and x.x V supplies.

In FIG. 1, PCMCIA control unit 13 is connected to receive the ISA bus 8 and the PCMCIA bus 9 and receives the VCCcore, VCCisa, and VCCcard voltages from power supply 11 and power switches 12 and is connected to provide the PSC control signals to power switches 12.

The control unit 13 functions to control the VCCcard voltage level of PCMCIA bus 9. The PCMCIA bus 9 connects the VCCcard voltage through the socket 14 to the PCMCIA card 15. Accordingly, one of the voltages 5 V, 3.3 V or x.x V, selected by power switches 12 under control of the PSC signals, from the power supply 11 is connected through socket 14 to the PCMCIA card 15. The PCMCIA control unit 13 ensures that under many different conditions, the actual voltage for VCCcard applied to the card 15 by the power switches 12 is not a damaging voltage which can damage the card 15.

The PCMCIA bus 9 includes the VCCcard line, CTRL control lines, address lines ADDR, and DATA lines which connect through socket 14 to the card 15. Similarly, socket 14 connects the card detect (CD) lines and the voltage sense (VS) lines to the PCMCIA control unit 13.

Figure 2:
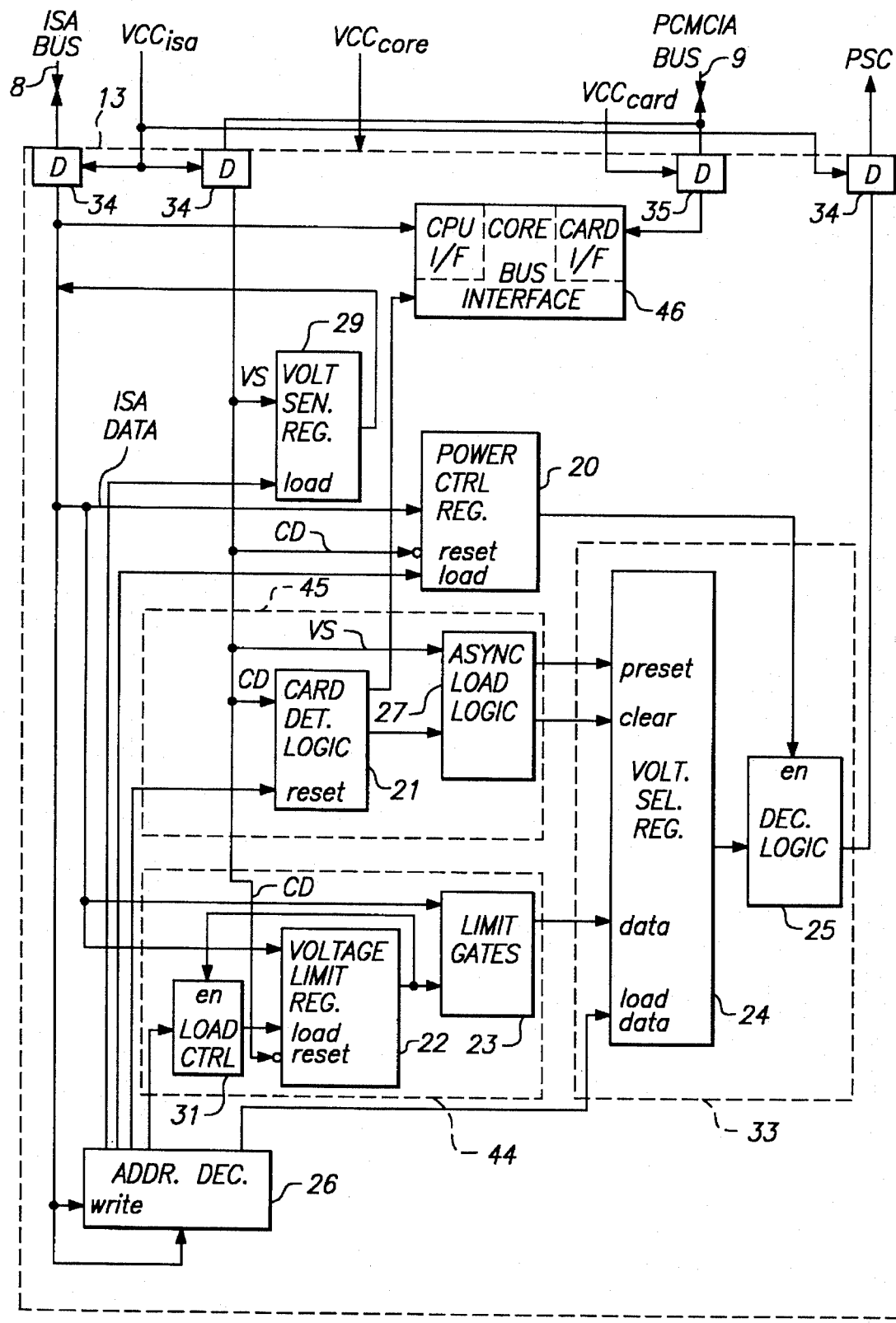
FIG. 2 depicts a block diagram of PCMCIA power control unit of FIG. 1.

In FIG. 2, further details of the PCMCIA control unit 13 of FIG. 1 are shown. The registers and logic of FIG. 2 are set and reset when addressed and commanded with addresses and data on the ISA bus 8. Addresses on the ISA bus 8 are decoded in address decoder 26 when decoder 26 is enabled by a write command on the bus 8.

In FIG. 2, a power control register 20 is set or reset to provide an enable or disable signal for turning power on or off, respectively, to the PCMCIA bus 9 and the PCMCIA card 15 of FIG. 1. The power control register 20 when addressed by the address on bus 8 loads an ISA data value into the register 20 to load an enable or disable state into register 20 which in turn provides an enable or disable input to the decode logic 25.

The voltage select register 24 receives the voltage sense (VS) values over the PCMCIA bus 9 from the card 15 of FIG. 1 asynchronously under control of the card detect logic 21 and asynchronous load logic 27. The card detect logic 21 in FIG. 2 senses the card detect (CD) signals from the PCMCIA card 15 of FIG. 1 to apply a card detect signal to the asynchronous load logic 27 without requirement of any software execution by the primary unit 3 of FIG. 1. The card detect signal from detect logic 21 to logic 27 is disabled when a reset signal is decoded by address decoder 26. The card detect signal from logic 21 to bus interface 46 is always present irrespective of the reset input. The response to the card detect signal from logic 21, asynchronous load logic 27 causes the "preset" or "clear" inputs to preset the VS values into the voltage select register 24 or to clear register 24. The card detect logic 21 and the asynchronous load logic 27 form the asynchronous code generation means 45.

The voltage limit register 22 is loaded by a decoded command from the address decoder 26 with data presented on the ISA bus 8. Register 22 stores a code value, representing the maximum voltage, that is stored under software control in voltage select register 24. The limit gates 23 load a code value from the ISA data lines of ISA bus 8 into the voltage select register 24. The voltage code value from the ISA data bus is limited by the code in the voltage limit register 22 so that the voltage represented by the code stored in voltage select register 24 does not exceed the voltage represented by the code stored in the voltage limit register 22.

In FIG. 2, load control 31 senses a load command decoded by address decoder 26 to load the voltage limit register 22. Load control 31 is enabled to gate the load command to register 22 only when register 22 has been reset with a 00 output. After register 22 has stored a value of 10 or 01, load control 31 is disabled and will not respond to any subsequent load commands from decoder 26 until register 22 is reset to 00. Register 22 and control 31 are, therefore, a write-once register means. Register 22 is reset by the absence of a CD signal which results whenever card 15 is not inserted in socket 14. Removal of card 15, therefore, resets register 22, enabling load control 31, while also resetting power control register 20 to remove power to socket 14 and any card 15 that is reinserted in socket 15.

The voltage select register 24 receives the software-commanded voltage code from the limit gates 23 in response to a load data command decoded by the address decoder 26. Accordingly, voltage select register 24 is synchronously loaded under command of control software executed by primary unit 3. The voltage limit register 22 and the limit gates 23 form the synchronous code generation means 44.

The decode logic 25 of FIG. 2 operates to decode the contents of the voltage select register 24, when enabled by the power control register 20, to provide the power select control (PSC) signals. The PSC signals from FIG. 2 connect to the power switch 12 in FIG. 1 through driver 34 to select one of the voltage supplies 5 V, 3.3 V or x.x V.

In FIG. 2, the PCMCIA control unit 13 includes level shifters (D) 34 and 35 that are powered by the VCCisa and VCCcard supplies, respectively. All of the other components in FIG. 2 are powered by VCCcore.

In FIG. 2, bus interface 46 interfaces ISA bus 8 to PCMCIA bus 9. The PCMCIA bus 9 has the CTRL, DATA and ADDR lines connected through driver 35 to CARD/IF of bus interface 46 and has VS and CD lines connected through driver 34. The ISA bus connects through driver 34 to the CPU/IF interface of bus interface 46. Bus interface 46, in response to a card detection output from card detect logic 21, causes an interrupt signal over the CTRL lines of ISA bus 8 to processor 5 of FIG. 1.

Operation

The address decoder 26 interfaces the PCMCIA control unit to the ISA bus 8, and provides load signals to load the bits on the ISA data bus into the various registers of FIG. 2. The voltage select register 24 is loaded asynchronously or synchronously under control software command to select the voltage to be applied to the card 15 of FIG. 1. The power control register 20 has a power enable bit that enables the selected voltage specified by the value in register 24 to be decoded. The register output is decoded by the decode logic 25, which produces voltage control signals PSC. The voltage bits in register 24 are preferably a binary code (for example, a 2-bit code) while the PSC voltage control signals are a 1 of N code (N=3, for example). Each voltage control signal from decode logic 25 controls a corresponding individual one of the power switches 12 in FIG. 1. In FIG. 1, for the example where N equals 3, three PSC lines exist, one for each of the 5 V, 3.3 V and x.x V supplies.

The power enable bit in register 20 is automatically reset when the card detect (CD) signals indicate that card 15 of FIG. 1 has been removed from socket 14. This operation disables decode logic 25 of FIG. 2 thereby preventing any of the power switches 12 from being selected and thereby preventing any power from being applied to card 15, hence preventing the third damage mode described above.

When card 15 is inserted in socket 14, the asynchronous load means 45 in response to the card detect logic 21 in response to the voltage sense (VS) inputs presets the voltage select register 24. This operation automatically presets the maximum safe voltage specified by VS for card 15 whenever card 15 is inserted into socket 14, even if the software in primary unit 3 of FIG. 1 fails to do so. Because the power enable bit in register 20 is reset whenever card 15 is not inserted in socket 14, the card power will remain off until power is turned on under control of control software. The control software is allowed to set the voltage select register 24 bits to select voltages at different times and for different reasons. When control software first writes to the voltage control register 24, the card detect logic 21 is reset and stops loading the voltage codes represented by voltage sense (VS) inputs into the voltage select register 24, and from that time on, the control software maintains control of the values in voltage select register 24. The voltage select register 24 is assigned an address, decodable by address decoder 26, which has never been used by old control software versions, and therefore, the old software versions cannot inadvertently change the voltage specified by register 24. These measures prevent the first damage mode described above.

In normal operation, control software that is aware of the possibility of multiple cards with different voltage requirements will set the voltage control bits in register 24 correctly so as not to damage the card 15. However, it is possible that in the case of a computer system crash, card 15 can be damaged by errors that occur. The voltage limit bits are provided in register 22 to avoid these errors. Software sets the limit bits in register 22 to reflect the maximum safe voltage for the card 15 at the same time or immediately after the voltage is initially selected for card 15 in register 24 under control software control each time card 15 is newly inserted into socket 14. Once these bits are written into register 22, register 22 cannot be written again until card 15 is removed from socket 14. These bits in register 22 limit the action of control software such that if control software attempts to select too high a voltage by writing too high a value into the voltage select register 24, actual values written into register 24 cannot exceed the voltage specified by the limit bits in register 22. This operation prevents the second damage mode described above.

Existing PCMCIA driver software typically responds to an interrupt issued to processing unit 5 of FIG. 1 which is generated when and indicates that card 15 has been newly inserted into socket 14. The software operation continues by reading the voltage sense register 29 to determine the status of the voltage sense (VS) input pins from the card 15, and by writing to the voltage control register 20 to enable decode logic 25 to apply power at the proper voltage to the card 15. Once card power has been applied, the software can then optionally read the CIS (card information structure) memory in the card 15 to determine whether card 15 must operate at the voltage specified by the voltage sense (VS) pins, or if alternative voltages are permitted. Depending on the CIS data from card 15, and other factors such as speed/power tradeoffs, the control software may then select a different card voltage for storage in voltage select register 24. At this point, the control software knows the maximum safe operating voltage for the card.

For protection, the following control software is invoked:

If (max_card_vcc=3) then limit_code=0x01;

else if (max_card_vcc<3) then limit_code=0x10;

voltage_limit_register=limit_code;

The foregoing control software sets the voltage limit bits (in the voltage limit register 22) to a value of limit_code which limits the range of values which may be written to the voltage select bits such that only voltages equal or less than indicated by limit_code may be selected. The 0x01 value is binary 01 and the 0x10 value is binary 10. Voltage select register 24 stores the following binary voltage codes 00, 01, 10 and 11 corresponding to voltages 5 V, 3.3 V, x.x V AND 3.3 V, respectively.

In an alternative configuration, the voltage sense signals (VS) are not connected to the voltage sense register 29, typically because of IC package pin limitations. In this case, instead of loading the voltage sense register bits into the voltage select register 29 when a card is installed, the code for the minimum possible voltage (x.x) is loaded into register 24. With this operation, the first damage mode described above is prevented because the maximum voltage selected is a voltage that will not damage any card; however, cards requiring a higher voltage will not operate correctly if the wrong control software is installed.

While the invention has been particularly shown and described with reference to preferred embodiments thereof it will be understood by those skilled in the art that various changes in form and details may be made therein without departing from the spirit and scope of the invention.

We claim:

1. A computer system including, primary means for executing control software, a pluggable card operating with a card voltage and having signal means for providing a CD signal for indicating when the pluggable card is plugged into the computer system, a power supply for providing at least first and second supply voltages, power switching means for selecting one of said supply voltages as said card voltage, power control means for controlling said power switching means to select one of said supply voltages, said power control means including, voltage select means for storing a voltage code for specifying said one of said supply voltages, power enable means for enabling said voltage select means and operable to be reset in the absence of said CD signal, code generating means operable for storing said voltage code in said voltage select means.

2. The computer system of claim 1 wherein said code generating means includes asynchronous means that operates independently of said control software.

3. The computer system of claim 2 wherein said pluggable card provides VS signals for indicating a voltage level for said pluggable card and wherein said asynchronous means includes card detect logic for providing a card detect signal in response to said CD signal and includes asynchronous load logic for presetting said voltage code into said voltage select means in response to said VS signal and said card detect signal.

4. The computer system of claim 1 wherein said code generating means includes synchronous means that operates under control of said control software.

5. The computer system of claim 4 wherein said control software provides a software voltage code for specifying a voltage level for said pluggable card, said synchronous means includes a voltage limit register for storing a limit code and includes limit gates for loading said software voltage code into said voltage select means or for loading said limit code into said voltage select means if said limit code specifies a voltage level lower than the voltage level specified by said software voltage code.

6. A computer system including, primary means for executing control software where the control software has two or more versions including a current version, a pluggable card operating with a card voltage, a power supply for providing at least first and second supply voltages, power switching means for selecting one of said supply voltages as said card voltage, power control means for controlling said power switching means to select one of said supply voltages, said power control means including, voltage select means operable only in response to said current version of said control software for storing a voltage code for specifying said one of said supply voltages, power enable means operable to be set in response to said control software for enabling said voltage select means, code generating means operable for generating said voltage code.

7. A computer system including, primary means for executing control software, a pluggable card operating with a card voltage, a power supply for providing at least first and second supply voltages, power switching means for selecting one of said supply voltages as said card voltage, power control means for controlling said power switching means to select one of said supply voltages, said power control means including, voltage select means operable in response to said control software for storing a voltage code for specifying said one of said supply voltages, power enable means operable to be set in response to said control software for enabling said voltage select means, code generating means operable in response to said control software for generating said voltage code and including limit means for limiting said voltage code to a maximum value.

8. A computer system including, primary means for executing control software, a pluggable card operating with a card voltage and having signal means for providing a CD signal for indicating when the pluggable card is plugged into the computer system, a power supply for providing at least first and second supply voltages, power switching means for selecting one of said supply voltages as said card voltage, power control means for controlling said power switching means to select one of said supply voltages, said power control means including, a voltage select means operable in response to said control software for storing a voltage code for specifying said one of said supply voltages, power enable means operable to be set in response to said control software for enabling said voltage select means and operable to be reset in the absence of said CD signal, code generating means for generating said voltage code.

9. A computer system including, primary means for executing control software, a pluggable card operating with a card voltage and having signal means for providing a CD signal for indicating when the pluggable card is plugged into the computer system, a power supply for providing at least first and second supply voltages, power switching means for selecting one of said supply voltages as said card voltage, power control means for controlling said power switching means to select one of said supply voltages, said power control means including, voltage select means for storing a voltage code for specifying said one of said supply voltages, power enable means for enabling said voltage select means and operable to be reset in the absence of said CD signal, asynchronous code generating means operable in response to said CD signal for storing said voltage code in said voltage select means.

10. A computer system including, primary means for executing control software, a pluggable card operating with a card voltage and having signal means for providing a CD signal for indicating when the pluggable card is plugged, a power supply for providing at least first, second and third supply voltages, power switching means for selecting one of said supply voltages as said card voltage, power control means for controlling said power switching means to select one of said supply voltages, said power control means including, voltage select means for storing a voltage code for specifying said one of said supply voltages, power enable means for enabling said voltage select means, code generating means operable in response to said CD signal for storing said voltage code in said voltage select means.

11. The computer system of claim 10 wherein said control software provides a software voltage code for specifying a voltage level for said pluggable card, said code generating means includes a voltage limit register for storing a limit code and includes limit gates for loading said software voltage code into said voltage select means or for loading said limit code into said voltage select means if said limit code specifies a voltage level lower than the voltage level specified by said software voltage code.

12. A computer system including, primary means for executing two or more versions of control software wherein one of said two or more versions of control software includes a current version of said control software, a pluggable card operating with a card voltage and having signal means for providing a CD signal for indicating when the pluggable card is plugged into the computer system, a power supply for providing at least first and second supply voltages, power switching means for selecting one of said supply voltages as said card voltage, power control means for controlling said power switching means to select one of said supply voltages, said power control means including,
  a voltage select means operable only in response to said current version of said control software for storing a voltage code for specifying said one of said supply voltages,
  power enable means operable to be set in response to said control software for enabling said voltage select means and operable to be reset in the absence of said CD signal,
  code generating means including synchronous means operable in response to said control software for generating said voltage code and including limit means for limiting said voltage code to a maximum value and including asynchronous code generating means operable in response to said CD signal for storing said voltage code in said voltage select means.

* * * * *